United States Patent
Li et al.

(10) Patent No.: US 7,065,521 B2
(45) Date of Patent: Jun. 20, 2006

(54) METHOD FOR FUZZY LOGIC RULE BASED MULTIMEDIA INFORMATION RETRIVAL WITH TEXT AND PERCEPTUAL FEATURES

(75) Inventors: Zhu Li, Palatine, IL (US); Bhavan Gandhi, Vernon Hills, IL (US); Brett L. Lindsley, Wheaton, IL (US)

(73) Assignee: Motorola, Inc., Schaumburg, IL (US)

( * ) Notice: Subject to any disclaimer, the term of this patent is extended or adjusted under 35 U.S.C. 154(b) by 562 days.

(21) Appl. No.: 10/383,897

(22) Filed: Mar. 7, 2003

(65) Prior Publication Data
US 2004/0177069 A1 Sep. 9, 2004

(51) Int. Cl.
G06F 17/30 (2006.01)

(52) U.S. Cl. .............................................. 707/3; 707/4
(58) Field of Classification Search ................ 707/1–5
See application file for complete search history.

(56) References Cited

U.S. PATENT DOCUMENTS

| | | | |
|---|---|---|---|
| 6,324,573 B1 * | 11/2001 | Rhoads | 709/217 |
| 6,640,145 B1 * | 10/2003 | Hoffberg et al. | 700/83 |
| 6,850,252 B1 * | 2/2005 | Hoffberg | 715/716 |
| 6,915,409 B1 * | 7/2005 | Peterson | 712/1 |
| 2003/0233305 A1 * | 12/2003 | Solomon | 705/37 |

OTHER PUBLICATIONS

Shih-Fu Chang et al., Visual Information Retrieval from Large Distributed Online Repositories, Communications Of The ACM, Dec. 1997/vol. 40, No. 12, pp 63-71.

Arnold W.M. Smeulders et al, Content-Based Image Retrieval at the End of the Early Years, IEEE Transactions On Pattern Analysis And Machine Intelligence, vol. 22, No. 12, Dec. 2000, pp 1349-1380.

Theo Gevers et al., PicToSeek: Combining Color and Shape Invariant Features for Image Retrieval, IEEE Transactions On Image Processing, vol. 9, No. 1, Jan. 2000, pp 102-119.

Chabane Djeraba, Content-Based Multimedia Indexing and Retrieval, IEEE MultiMedia, Apr.-Jun. 2002, pp 18-22.

(Continued)

*Primary Examiner*—Mohammad Ali
*Assistant Examiner*—Sathyanarayan Pannala

(57) ABSTRACT

A search system (200) for a database (224) including records having a multiple disparate types of media is provided. The search system supports queries, that include different types of search criteria, including content based retrieval search criteria. A fuzzy logic method (400) is provided for effectively combining the results of different types of search criteria. The fuzzy logic method also allows confidence levels entered by the user for search criteria to be considered in combining results. Retrieval relevance values for documents for at least some search criteria are used in the fuzzy logic method. For content based image retrieval searches, the retrieval relevance values are computed by mapping a distance between quantitative characterizations of a search basis image, and other images into a finite range.

20 Claims, 7 Drawing Sheets

OTHER PUBLICATIONS

Ingemar J. Cox et al, The Bayesian Image Retrieval System, *PicHunter*: Theory, Implementation, and Psychophysical Experiments, IEEE Transactions On Image Processing, vol. 9, No. 1, Jan. 2000, pp 20-37.

Miroslaw Bober, MPEG-7 Visual Shape Descriptors, IEEE Transactions On Circuits And Systems For Video Technology, vol. 11, No. 6, Jun. 2001, pp 716-719.

Sylvie Jeannin et al., MPEG-7 Visual Motion Descriptors, IEEE Transactions On Circuits And Systems For Video Technology, vol. 11, No. 6, Jun. 2001, pp 720-724.

B. S. Manjunath et al. Color and Texture Descriptors IEEE Transactions On Circuits And Systems For Video Technology, vol. 11, No. 6, Jun. 2001, pp 720-724.

Myron Flickner et al., Query by Image and Video Content: The QBIC System, IEEE, Sep. 1995, pp 23-32.

Virginia E. Ogle et al., Chabot: Retrieval from a Relational Database of Images, IEEE Sep. 1995, pp 40-48.

Xiang Sean Zhou et al., Unifying Keywords and Visual Contents in Image Retrieval, IEEE MultiMedia, Apr.-Jun. 2002, pp 23-33.

* cited by examiner

METHOD FOR FUZZY LOGIC RULE BASED MULTIMEDIA INFORMATION RETRIVAL WITH TEXT AND PERCEPTUAL FEATURES

FIELD OF THE INVENTION

The present invention relates in general to information retrieval. More particularly, the present invention relates to search systems for information retrieval.

BACKGROUND OF THE INVENTION

During the last decade, the proliferation of image scanners, and digital cameras, along with the advent and subsequent rapid growth of the World Wide Web has led to substantial increases in the number of digitally stored images. The taking and storing of digital pictures has been further encouraged by significant reduction in memory costs. Image files are now commonly included in multimedia documents.

The image files that a person or organization can readily collect can quickly become so numerous that being able to locate particular image files in the collection that are sought for some purposes is potentially time consuming.

Traditionally the field of Information Retrieval (IR) has been focused on searching structured, and/or unstructured text documents. As an extension of traditional IR, one approach to locating images relies on applying traditional IR techniques to short annotation, which are written by a user for each image file.

A newer category of methods know as Content Based Image Retrieval (CBIR) use algorithms to operate on image files in order compute a quantitative characterization (e.g., vector) or each image files, and then uses such quantitative characterizations to judge the degree of similarity of two or more documents. The quantitative characterization can address features such as the color, texture, and shapes included in the image files. Typically in performing a search, a user would select an image file as a basis to be used in the search, and then select one or more particular CBIR algorithms to be used. A search engine would then try to find images that have quantitative characterization, calculated per the selected CBIR algorithms, which are close to the quantitative characterization of the basis image file. Such CBIR techniques are improving and useful however they have not rendered searching of text data associated with image files obsolete. The latter is still very useful.

It would be desirable to be able to enjoy the advantages of a variety of different information retrieval techniques simultaneously in one system.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION OF THE PREFERRED EMBODIMENTS

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
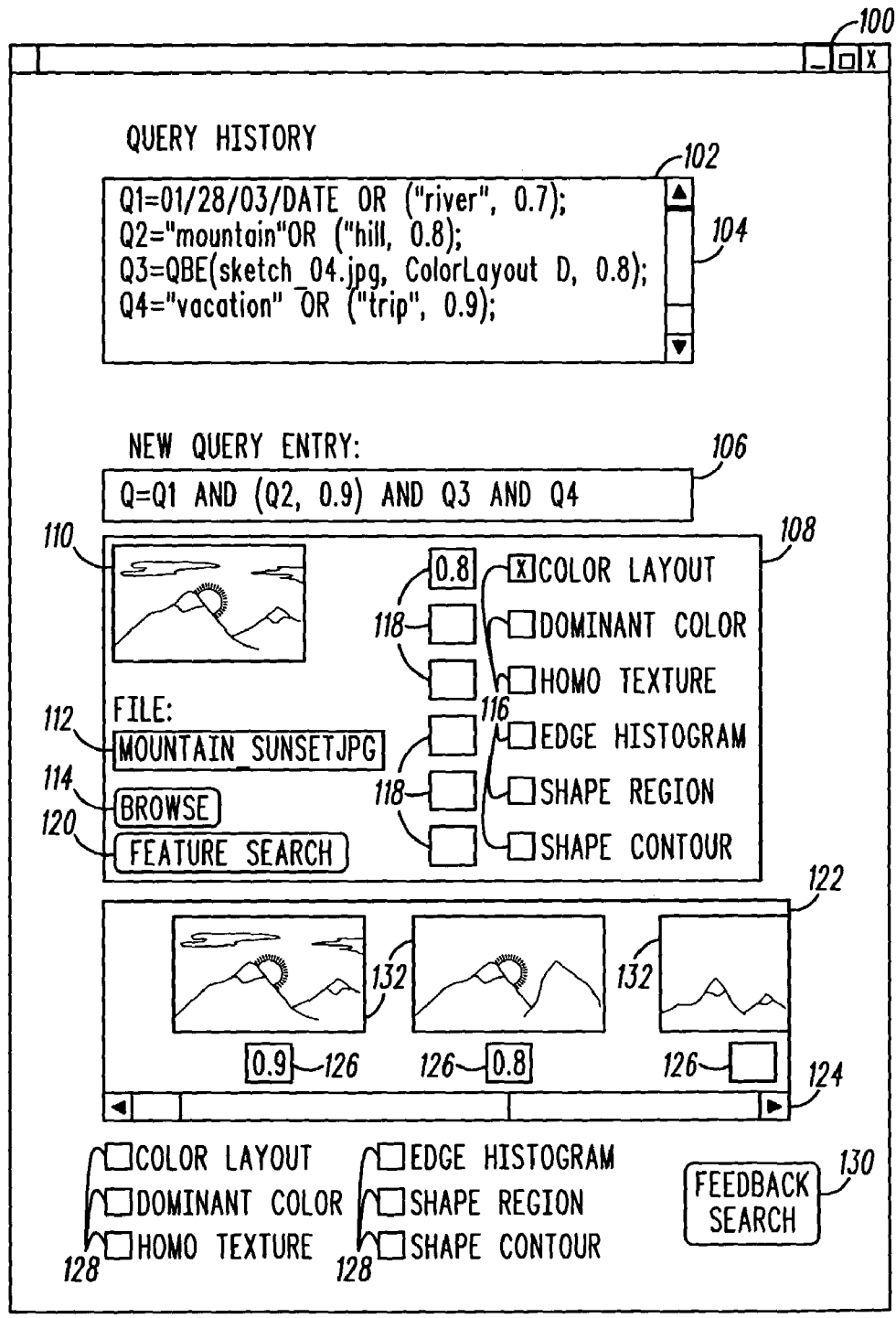
FIG. 1 is an illustration of a graphical user interface of a multimedia record search system according to the preferred embodiment of the invention.

FIG. 1 is an illustration of a graphical user interface (GUI) 100 of a multimedia record search system 200 (FIG. 2) according to the preferred embodiment of the invention. The GUI comprises a plurality of elements as will presently be described.

A query history box 102 shows queries previously performed during a search session. Queries listed in the query history box are labeled by sequential numbers, prefixed by the letter Q (e.g., Q1, Q2, Q3 . . . ). A user can incorporate past queries listed in the query history box 102, into new queries, by referencing the past query using the label shown in the query history box 102. A scroll bar 104 is provided for moving up and down in the query history box 102.

A new query entry box 106 is used to display each new query being entered by the user. A prompt such as "Q=" is optionally displayed in the query entry box.

A content based image retrieval (CBIR) section 108 of the GUI is used to specify image files to be used as the basis for CBIR searches, the type or types of CBIR search algorithm to be used, and a user specified confidence level (CL) that quantifies the confidence that the user has that the specified CBIR searches correlates with what the user is ultimately seeking. In performing a CBIR search, a CBIR algorithm will be used (or will have previously been used) to compute a quantitative characterization (e.g. feature vector) of the image file that is used as the basis of the CBIR search. A CBIR search engine 212 (FIG. 2) then searches for other image files that are characterized by a quantitative characterization computed using the same CBIR search algorithm, that are within a predetermined maximum distance of the quantitative characterization of the image file used as the basis of the search.

The CBIR section 108 includes a display area 110 for displaying an image being used as a basis for a CBIR search, a file name text box 112 for displaying the file name of the image being used as the basis for the CBIR search, and a browse button 114 for bringing up a file selection window (not shown) for selecting the file to be used as the basis for the CBIR search. The CBIR section 108 further comprises a list of different types of CBIR search algorithms, a first set of check boxes 116 for selecting one or more of the types of CBIR search algorithms, and a first set of small text boxes 118 on the left of each check box 116 for entering numerical values indicative of the user's confidence level (CL) that the corresponding type of CBIR search is correlated with what the user is ultimately seeking. Alternatively, instead of text boxes 118, drop down menus with a plurality of options are provided. Such drop down menus can, for example contain a plurality of entries each having a different number of stars. Each number of stars corresponds to a numerical value. For example five stars corresponds to one, four stars to 0.8 and so on. Thus rather than having to enter numerical values, the user would select a number of stars corresponding to the CL. Alternatively, sliders can be provided to accept user input of CL values. A feature search button 120 is provided for initiating a CBIR search. Any number of available CBIR algorithms, including those that have been developed and reported in the scientific literature or patents, and those yet to be developed can be used in conjunction with the present invention. A common feature of CBIR algorithms that is utilized in the present invention is that such algorithms generate quantitative characterizations of images. Such quantitative characterizations are used in the present invention in computing retrieval relevance values of multimedia records (documents) that are in turn used in evaluating retrieval relevance values of final answer sets of complex fuzzy logic queries that include disparate types of search criteria (e.g., both text and CBIR). The CBIR algorithm types shown in FIG. 3: "Color Layout", "Dominant Color", "Homogeneous Texture", "Edge Histogram", "Shape Region", and "Shape Contouring", are among the CBIR algorithm types that can be used in conjunction with the present invention. The internal details of the CBIR algorithms are beyond the focus of the present invention. Examples of methods of calculating quantitative characterizations of images that can be applied to the present invention includes those discussed in B. S. Manjunath, Color and Texture Descriptors' IEEE Transactions on Circuits and Systems for Video Technology, Vol. 11, No. 6, June 2001 and Miroslaw Bober, 'MPEG-7 Visual Shape Descriptors' IEEE Transactions on Circuits and Systems for Video Technology, Vol. 11, No. 6, June 2001.

The query labeled Q3 in the query history box 102 shows syntax generated using the CBIR section 108. The syntax for query Q3 reflects that an image file labeled $sketch_{13}$ 04.jpg was selected as the basis for the Q3 query CBIR search, that the color layout type CBIR search criteria was selected, and the user indicated a confidence level of 0.8 for the query.

The GUI 100 also comprises a search results display window 122, in which a number of images 132 found by the last search performed are displayed. A scroll bar 124 is provided for moving left and right in the search results display window 122. Alternatively, each image 132 displayed in the results display window 122 is a hyperlink to an entire multimedia documents that includes the image or a full size version of the image. The entire multimedia documents are preferably displayed in separate windows (not shown). Although not shown a document title can be displayed adjacent each image 132 in the results display window 122. Below each image 132 in the search results display window 122, one of a plurality of small text boxes 126 is provided. When search results are initially displayed, the small text boxes include retrieval relevance values. The user can overwrite the retrieval relevance values in entering feedback numbers for each image. The retrieval relevance values and the feedback number are preferably restricted to a finite range e.g. zero to one. Alternatively, any feedback number is accepted and the feedback numbers are normalized. Alternatively, in lieu of or in addition to the small text boxes 126, sliders or drop down lists such as discussed above in connection with text boxes 118 are provided. The different types of search criteria that are listed in the CBIR search section are listed again below the search results display window 122. A second set of check boxes 128 is provided for each of the different types of search criteria, below the search results display window 122. The second set of check boxes 128 is used to specify a type of CBIR search criteria that are to be used in searches that are generated on the basis of user feedback. A feedback search button 130 is provided for initiating a search based on user feedback. In generating a search based on user feedback, the CBIR search criteria that the user selects is applied to each image for which the user has provided feedback by entering a feedback number in order to compute quantitative characterizations. Then, a weighted sum of the computed quantitative characterizations in which the weights are based on the feedback numbers is computed. Each weighted sums is then used as a new search criteria. The operation of the search system is described more fully below with reference to FIGS. 2–5.

Figure 2:
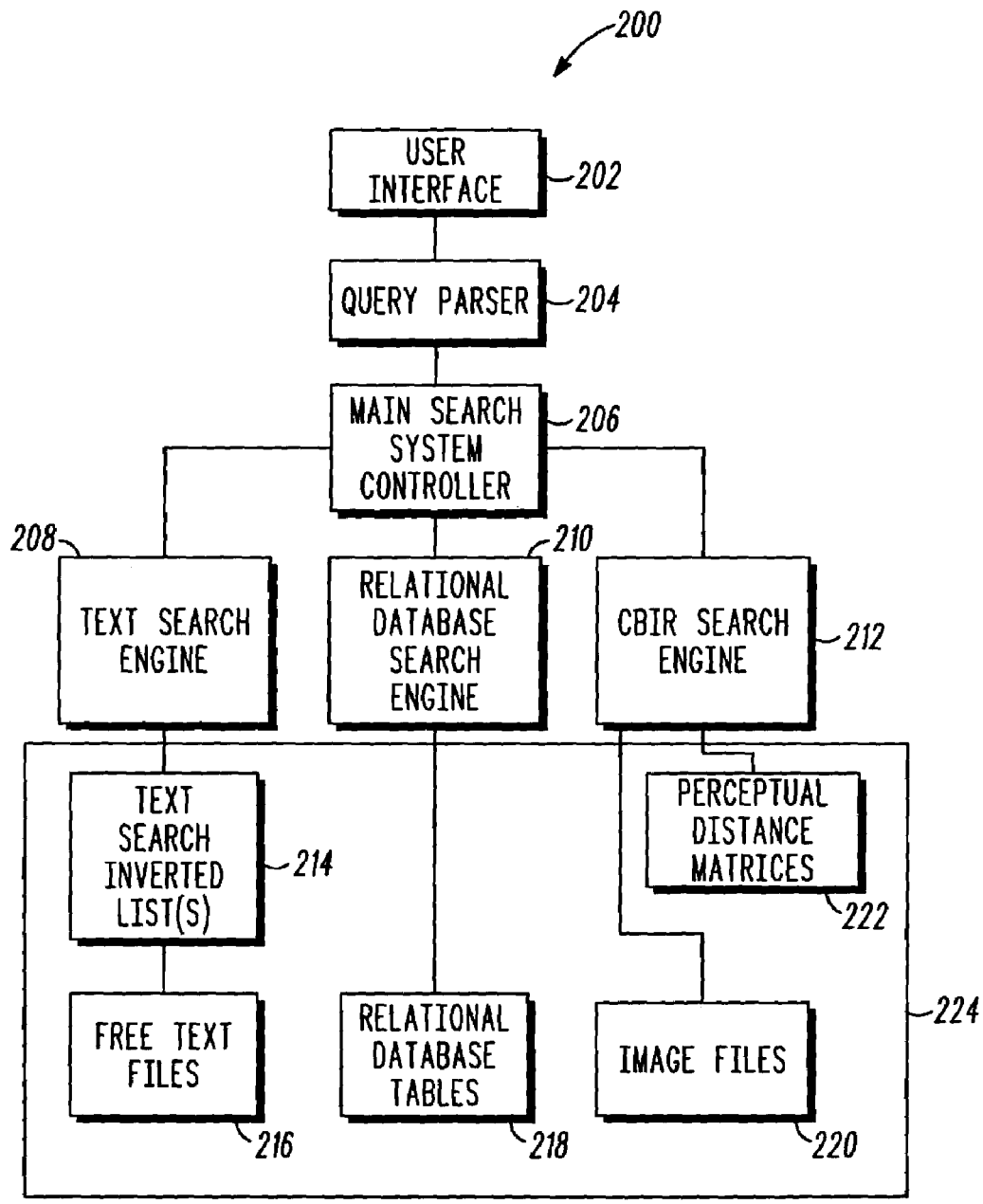
FIG. 2 is a functional block diagram of the multimedia record search system according to the preferred embodiment of the invention.
Figure 3:
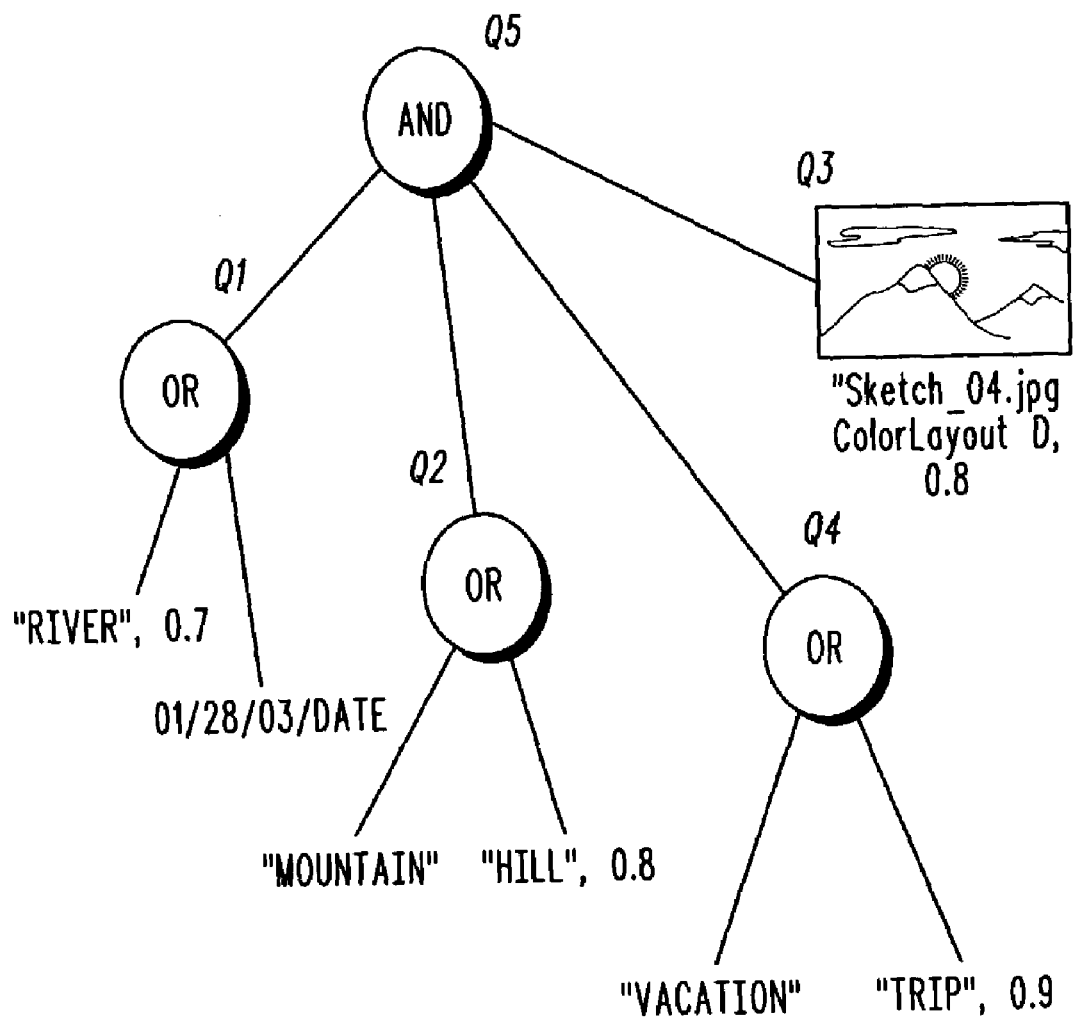
FIG. 3 is tree diagram representation of a multimedia query according to the preferred embodiment of the invention.

FIG. 2 is a functional block diagram of the multimedia record search system 200 according to the preferred embodiment of the invention. In the search system 200 a user interface component 202, which presents the graphical user interface 100 shown in FIG. 1 is coupled to a query parser 204. The query parser is coupled to a main search system controller 206. The query parser 204 receives each query string input by users, and builds a logical representation of the query that is used by the main search system controller 206. The parser 204 takes into account search language syntax, and rules of precedence of operators prescribed for the search system 200. Logical representations of queries can be illustrated by tree diagrams such as shown in FIG. 3 and described more fully below.

The main search system controller 206 is coupled to, and coordinates the functioning of a text search engine 208, a relational database search engine 210, and a CBIR search engine 212. The text search engine 208 is used to perform text searches in free text portions of multimedia documents. The text search engine is preferably capable of computing a retrieval relevance values of text files with respect to text search criteria. Various method of calculating retrieval relevance values of text files can be used. Various methods known in the field of information retrieval can be used to quantify retrieval relevance for text search results, and from such quantifications, retrieval relevance values restricted to a finite range can be computed. Some such methods rely on counting the frequency of occurrence of search words, and some take into account the location of search words within documents. Specific internal details of IR techniques for quantifying relevance of text search results are beyond the focus of this invention.

The relational database search engine 210 is used to perform searches in structured data included or associated with multimedia documents. Structured data that is searched by the relational database search engine 210 can for example comprise such data as date, location, photographer name, and multimedia document author last name. The relational database search engine is also preferably capable of providing retrieval relevance values.

The CBIR search engine 212 is used to compute quantitative characterizations of images that are the basis of CBIR searches, and images to be searched.

The search engines 208, 210, 212 access data in a database 224. Data in the database 224 preferably comprises multimedia documents split into component media parts. The database 224 includes a number of components including one or more text search inverted lists 214, a plurality of free text files 216, one or more relational database tables 218, a plurality of image files 220, and one or more image perceptual distance matrices 222 e.g., one for each type of CBIR search. Data in the database 224 constitutes a multimedia information resource. According to an alternative embodiment of the invention, instead of or in addition to the image files 220, the database 224 includes audio files, which are searched using pattern match filtering techniques. In as much as video files include a sequence of images, system and method described herein is alternatively applied to databases including video files. Video files can be processed to extract a number of key frames, and such key frames can be searched as image files. For video files, quantitative characterizations based on overall or localized motion activity are alternatively used to assess the similarity video files being searched and a video file used as the based of a content based search.

The text search engine 208 accesses the one or more inverted lists 214, that are used for text searching. The inverted lists 214 are derived from the free text files 216. The relational database search engine 210 accesses relational database tables 218 that include structured data components of the multimedia documents. The CBIR search engine 212 accesses the perceptual distance matrices 222, or in the case that the CBIR search engine is performing a search based on an image file that is not included in the perceptual distance matrices 22, the CBIR search engine 212 accesses the image files 220 directly. The perceptual distance matrices 222 are derived from images in the image files 220.

Each perceptual distance matrix 222 is computed from a specific type of CBIR feature, or criteria. (e.g., Dominant Color, Homogeneous Texture). The perceptual distance matrices each comprise a plurality of perceptual distances. Perceptual distances are distances between quantitative characterizations (e.g., feature vectors) of two images, that are calculated using a particular CBIR algorithm (e.g., Dominant Color algorithm, Homogeneous Texture algorithm). Perceptual distances are measures of perceived dissimilarity. The distances are calculated using a technique appropriate to the form of the quantitative characterizations. For example in the case that the quantitative characterizations takes the form of feature vectors, the distance between two feature vectors is preferably calculated using either the one-norm (also referred to as the L1 norm) or two-norm (also referred to as L2 norm or Euclidean norm) rules. For CBIR search quantitative characterizations that are neither vectors nor scalars, other types of distance functions can be defined for use in the search system 200.

The perceptual distance matrices 222 are symmetric so only the upper half (above the diagonal), or lower half of each matrix 222 needs to be stored. Each row of each image perceptual distance matrix 222 corresponds to a particular image file in a collection of images, and similarly each column of each image perceptual distance matrix 222 corresponds to a particular image file in the same collection of images. Each element of a perceptual distance matrix 222 for a particular CBIR search algorithm quantifies the similarity of two image files, one of which corresponds to the row of the entry, and the second of which corresponds to the column of the entry, in respect to the particular CBIR algorithm. Consequently, elements on the diagonal of each perceptual distance matrix 222 have the minimum possible value (e.g., zero) for the perceptual matrix 22 because they stand for perceptual distance between an image and itself. Accordingly, the diagonal elements need not be stored. For example for a collection of N images in the database database 224 then for a particular feature there is a N by N perceptual distance matrix P with its entry $P_{j,k}$ equals to the perceptual distance between an ith image and a kth image. The perceptual distance matrices 222 for a collection of documents can be computed in a batch, and stored for later use during searches by users. If the user bases a CBIR search on an image that is included in precomputed image perceptual distance matrices, the CBIR search time will be reduced because the image retrieval relevance values will not need to be computed in response to the users entering the search.

Image retrieval relevance values (RRV's) are derived from the perceptual distance. Image RRV's and RRV's for other types of queries quantify the degree to which particular documents meet particular search criteria. The RRV's are also used in performing fuzzy logic operations as will be described below in more detail with reference to FIGS. 4–5. The image RRV numbers are preferably derived from the perceptual distances, by mapping the distances into a finite range. According to the preferred embodiment of the invention image RRV numbers are calculated from distance by applying the following formula:

$$RRV_{i,j}{}^C = (1 - H(G_F(X_i{}^C - X_j{}^C)))^\eta \qquad \text{EQU. 1}$$

where, $RRVi,j^C$ is a retrieval relevance value of an ith image to a jth image (one of which is used as the basis of a CBIR search) for a cth CBIR algorithm;

$x_i$ is a quantitative characterization of the ith image computed with the Cth CBIR algorithm;

$x_j$ is a quantitative characterization of the jth image computed with the Cth CBIR algorithm;

G is a particular type (denoted F) of distance function (e.g., 1-norm, 2-norm);

H is a mapping function that maps an argument into a finite range; and $\eta$ is a constant exponent.

The mapping function H that is used in equation 1 preferably takes the form:

$$H(\text{arg}) = \begin{cases} 0, & \text{arg} < d_{min} \\ \dfrac{\text{arg}}{d_{max}}, & x \in [d_{min}, d_{max}] \\ 1.0, & \text{arg} > d_{max} \end{cases} \qquad \text{EQU. 2}$$

where, $d_{min}$ is approximately equal to a minimal perceptible distance;

$d_{max}$ corresponds approximately to a distance between quantitative characterizations beyond which further increases are not generally perceived as more different.

$d_{min}$ and $d_{max}$ values are chosen for each type of CBIR search algorithm separately when the search system 200 is being set up. The choice of $d_{min}$ and $d_{max}$ is based on somewhat subjective evaluation of the perception of differences between a large number of pairs of images that are separate by a variety of distances. The constant exponent $\eta$ is also chosen independently for each type of CBIR search criteria. The exponent $\eta$ adds another degree of control. $\eta$ is preferably set to a value of less than one in order to magnify the effect of small distances. More preferably, the value of $\eta$ is set to about ½.

Note that according to the form of equation one, and the use of the mapping function given in equation two, the image RRV numbers are restricted to a finite range, in particular to the range zero to one. Because the mapped distance is subtracted from one, one corresponds to the maximum similarity and zero to the minimum similarity. Having RRV values limited to a finite range enables fuzzy logic queries that include a variety of types of searches (e.g., free text, fielded text, and multiple different types of CBIR searches), be evaluated, and retrieval relevance values that are based on disparate search criteria to be assigned to the final answer set in an unified, meaningful way. Restricting the RRV's to a finite range and using a mapping function that takes into account minimum and maximum perceptible distances through $d_{min}$, and $d_{max}$ allows, disparate types of searches to be combined in a meaningful way. The potential problem of distance computed according to one CBIR technique overwhelming distances computed according to other CBIR techniques is avoided. For the same reason retrieval relevance values returned by the text search engine 208, and the relational database search engine 210 are also preferably restricted to or mapped into a finite range. By having all the retrieval relevance values restricted to or mapped into finite ranges, preferably the same finite range, it is possible to combine retrieval relevance values from image, free text, and structured text (and optionally audio searches) in a meaningful way in a search system that uses fuzzy logic rules.

Equations one and two can also be applied to other types of media files, such as audio or video files. In applying equations one and two to other types of media, the quantitative characterizations that are appropriate to the type of media tow which equations one and two are applied are used.

The search system 200 preferably allows a user to perform a CBIR type search based on an image that is not included in the database 224. To do so the user actuates the browse button 114 of the GUI 100, and selects an image to be used as the basis for the CBIR type search from a directory. In this case a quantitative characterization of the basis image and RRV of images in the database 224 with respect to the basis image will not have been calculated ahead of time, and are calculated in response to the user's entering the search. To expedite searches for which the user supplies a image as the basis, it is advantageous to have quantitative characterizations of images in the image files 220, (not embedded in the perceptual distance matrix elements), stored in the database 224. The quantitative characterizations (e.g., feature vectors) are preferably stored included in the relational database tables 218.

FIG. 3 is tree diagram 300 representation of a multimedia query according to the preferred embodiment of the invention. The query parser 204 generates a logical representation of queries entered by the user that can be visually represented as a tree diagram, such as shown in FIG. 3. The tree diagram 300 shown in FIG. 3 represents the query shown in the new query entry box 106 of the GUI 100 in FIG. 1, which incorporates queries shown in the query history box 102. The tree diagram 300 includes a plurality of operator nodes including an AND and three OR operands. In the present system the AND and OR operators are fuzzy logic operators in the sense that members of the answer sets of these operators will be associated with RRV numbers that are derived from RRV numbers in sets that are arguments of the operators.

The tree diagram 300 also includes a plurality of different types of search criteria in leaf positions. The search criteria are arguments of the search string. Each search criteria when evaluated yields an answer set which is then combined by operators with one or more other answer sets yielded by other search criteria. One search criteria: 'sketch$_{13}$0.4.jpg, ColorLayout D, 0.8', specifies that a color layout type CBIR search is to be performed based on a specified image file sketch$_{13}$04.jpg, and that the user has indicated a confidence level of 0.8 that such search correlates with what the user is ultimately seeking. In performing such a search the CBIR search engine 212 seeks multimedia documents including images, that have quantitative characterization of color layout that are within a predetermined distance of the quantitative characterization of the color layout of sketch$_{13}$04.jpg. In general each CBIR image search criteria preferably comprises a selection of a CBIR algorithm, a selection of a basis image, and optionally, a user specified confidence level.

Unfielded (free) text search criteria in the tree diagram include searches for the words "river", "mountain", "hill", "vacation", and "trip". Note that for the searches for the words "river", "hill" and "trip", the user has specified confidence levels of 0.7, 0.8, and 0.9 respectively. These latter confidence levels are entered by the user to quantify the confidence that the user has that searches with these key words correlate with what the user is ultimately seeking. Unfielded searches are preferably performed by the text search engine 208 using the text search inverted lists 214.

The tree diagram 300 also includes a field search 'Jan. 28, 2003/DATE' for multimedia documents with the specified date. In performing such as search the relational database search engine 210 accesses date information in relational data base tables 218. Alternatively, the user could have entered a confidence level for the fielded search as well.

The nodes of the tree diagram 300 can be categorized as being in one of a plurality of layers. The root node alone is in a zeroth layer. Each of the other nodes is in an integer numbered layer where the integer number is equal to the number of edges between the node under consideration and the root node. In evaluating a query, first the search criteria in the leaf positions of the tree 300 are evaluated using the search engines 208, 210, 212. Thereafter operators in successive layers are evaluated, starting with the highest number layer, and working toward the root node. The answer set for the root node operator is taken as the answer set for the query as a whole.

Figure 4:
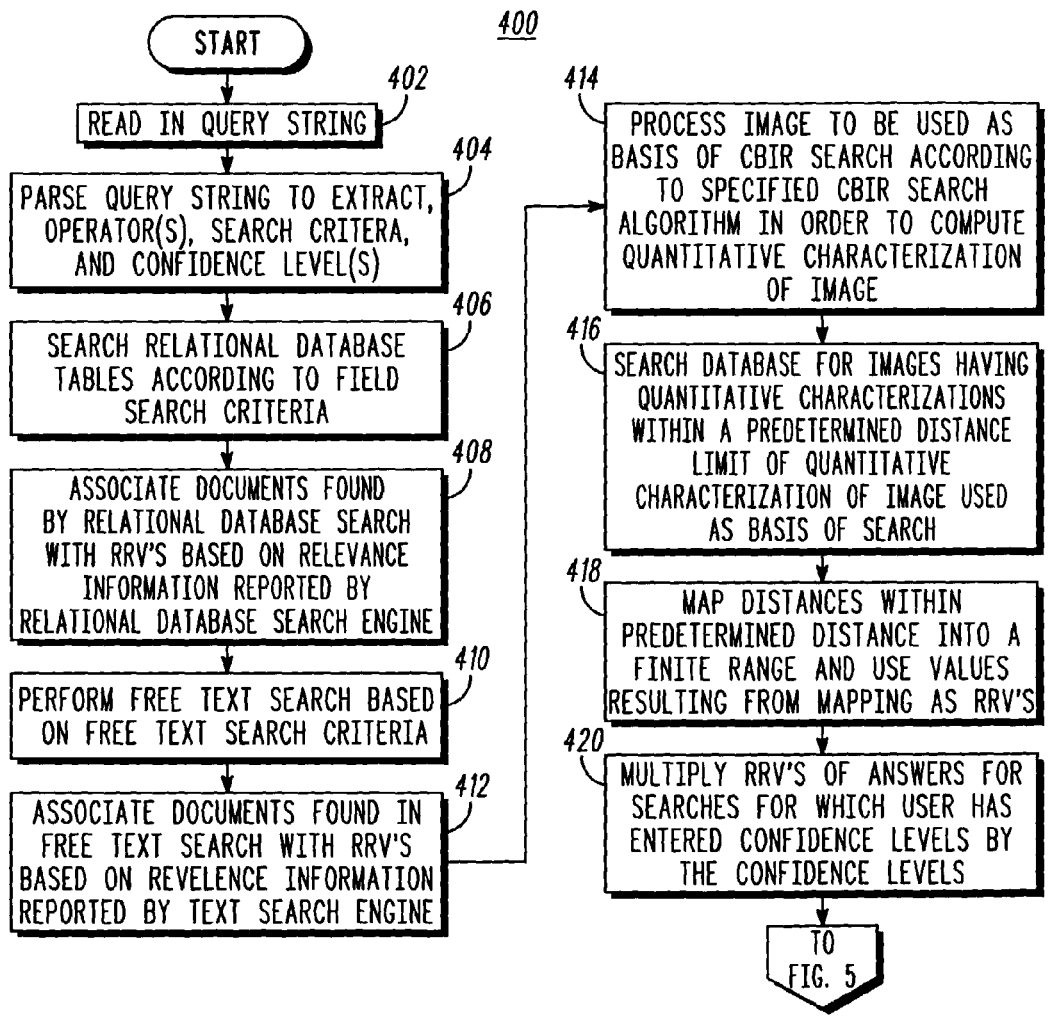
FIG. 4 is a first part of a flow chart of a method for performing multimedia queries according to the preferred embodiment of the invention.

FIG. 4 is a first part of a flow chart of a method 400 for performing multimedia queries according to the preferred embodiment of the invention. In step 402 a query string entered by the user is read in. In step 404 the query string is parsed to extract search criteria (the arguments or leaves of the query), confidence levels specified by the user for search criteria, and the operators of the query, and to determine the logical structure of the query represented in the query string.

In step 406 the relational database tables 218 are searched according to any field search criteria included in the query. Step 406 generates an answer set for each fielded search criteria that includes one or more documents. Optionally, in step 408 documents in the answer sets of the search performed in step 406 are associated with relevance retrieval values based on relevance information returned by the relational database search engine 210. In step 410 text searches are performed based on any non-fielded (free) text search criteria included in the query string. Optionally, in step 412 documents in answer sets of the search performed in step 410 are associated with retrieval relevance values based on relevance information returned by the text search engine 208. Preferably, relevance information returned by the relational database engine and text search engine 208, are processed (e.g., mapped), if necessary to produce retrieval relevance values that are restricted to a finite range, e.g. zero to one, wherein the most relevant value is one, and the least relevant zero.

Alternatively instead of steps 408 and 412 in the case that the relational database search engine 210 or the text search engine does not return relevance information, documents in answer sets of the searches performed in step 406 or 410 are assigned default relevance retrieval values, such as for example 1.0 or 0.5. Alternatively, only CBIR searching is performed.

In step 414 an image that is to be used as the basis of a CBIR search (i.e., the image specified in the file name text box 112 of the GUI 100) is processed according to specified CBIR search algorithm (e.g., Dominant Color, Homogeneous Texture) in order to compute a quantitative characterization (e.g., feature vector).

In step 416 the database 224 is searched for images that have quantitative characterizations computed per the specified search CBIR search algorithm (used in step 414) that are within a predetermined distance limit of the quantitative characterization of the image used as the basis of the CBIR search (calculated in step 414).

Different distance limits are preferably used in step 416 for each type of CBIR search algorithm. The predetermined distance limit for each type of CBIR search algorithm is preferably selected after reviewing many images along with quantitative values generated by applying the CBIR algorithm to the images, and selecting a value that typically corresponds to a high degree of perceived similarity in respect to the CBIR search criteria. The selection of the predetermined distance limits are somewhat subjective.

As described above in the case that an image that is used as the basis for the CBIR search is already included in the database 224, use of the precomputed perceptual distance matrices 222 accelerates execution of the search for images. Additionally, organizing quantitative characterizations (e.g., feature vectors) in the database 224 using a clustering algorithm is helpful in accelerating searches for images that have quantitative characterizations within a distance limit of a quantitative characterization of a search basis image. The latter is particularly useful when using a CBIR search basis image that is not included in precomputed perceptual distance matrices. The internal details of clustering algorithms are outside the focus of the present invention.

In step 418 distances that are within the predetermined distance limit, i.e. distances for images in the answer set of the CBIR search performed in steps 414–416, are mapped into a finite range, and the values resulting from the mapping are assigned to be the retrieval relevance values for the documents that include the images in the answer sets.

The RRV numbers that are assigned to documents, are only valid for the answer set in which they are assigned. If the same document appears in two different answer sets (e.g., one based on a text search, and one based on a CBIR image search) the document will, except for coincidence, have a different RRV values in the two answer sets.

In step 420, in the case that the user has specified a confidence level in connection with any search criteria (e.g., free text, fielded search or image) the RRV that are associate with documents in answer sets for the search criteria for which the user has specified a confidence level are recalculated by multiplying by a function, preferably the identity function, of the confidence level. Confidence levels are preferably restricted to the range of zero to one or mapped into that range. Using confidence levels allows users judgment as to the relative importance of different search criteria to be taken into account in computing final fuzzy retrieval relevance values for answers in the answer set of the entire query.

Figure 5:
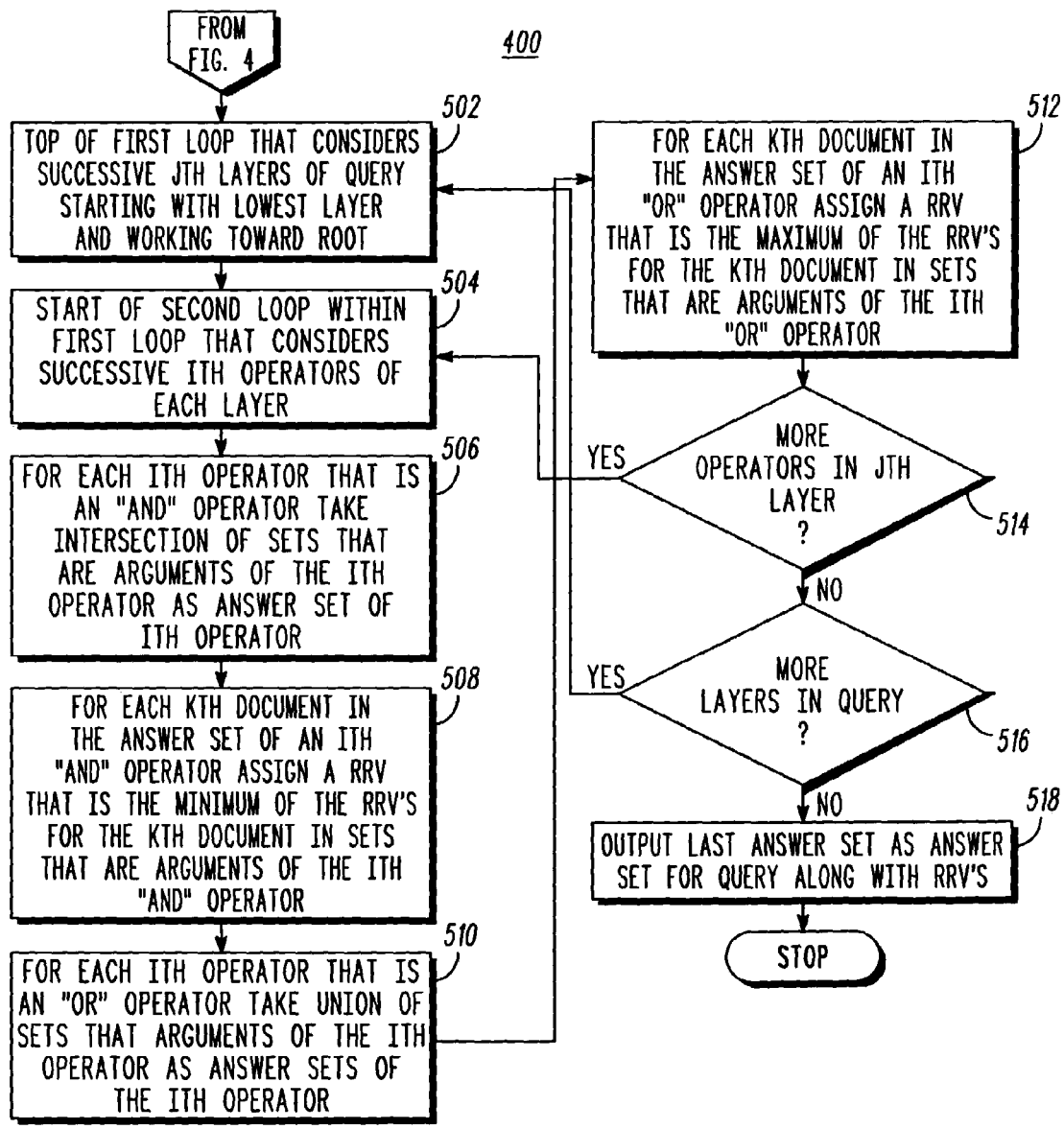
FIG. 5 is a second part of the flow chart started in FIG. 4.

The method 400 continues in FIG. 5. Block 502 is the top of a first loop that considers successive jth layers of the query starting with the lowest layer (highest layer number) and working toward root.

Block 504 is the top of a second loop within the first loop that considers successive ith operators in each jth layer. The method 400 provides for the use of "AND" and "OR" operators. In this method 400, the AND and OR operators are not common Boolean operators. A Boolean operators operate on two argument sets and produces an answer set in which each member of the answer set is equally consider a member of the answer set. In contrast the method 400 uses the AND and OR operators that are fuzzy logic operators. According to the method 400 each operator operates on argument sets and produces an answer set in which each member is associated with a membership value equal to its retrieval relevance value that is derived from retrieval relevance values of the member in the context of at least one of the argument sets. The particular fuzzy logic implemented in the method 400 is well suited to combining search results based on different types of criteria, and combining answer sets from perception related search criteria such as CBIR searches, because despite the fact that the CBIR searches are deterministic i.e., their output is precisely determined by their input, perception itself, which the CBIR algorithms attempt to emulate, is in itself somewhat subjective.

Steps 506–508 within the second loop are applied to each AND operator in the jth layer. In step 506 for each ith AND operator an intersection of sets that are operands of the ith AND operator are taken as the answer set of the ith AND operator. In step 508 a retrieval relevance value is assigned to each kth document in the answer set of each ith AND operator that is the minimum of the retrieval relevance values associated with the kth document in sets that are arguments of the ith AND operator. Using a minimum function is consistent, in spirit, with the restrictive conservative intent of using an AND operator.

Steps 510–512 within the second loop are applied to each OR operator in the jth layer. In step 508 for each ith OR operator a union of sets that are operands of the ith OR operator is taken as the answer set of the ith OR operator. In step 512 a retrieval relevance values is assigned to each kth document in the answer set of each ith OR operator that is the maximum of the retrieval relevance values associated with kth document in the answer sets that are arguments of the ith operator. Using a maximum function is consistent, in spirit, with the inclusive liberal intent of using an OR operator.

Block 514 is a decision block, the outcome of which depends on whether there are more operators in the jth layer to be considered. If operators remain to be considered, the method 400 loops back to block 504 to consider a next operator in the jth layer. If on the other hand, there are no further operators in the jth layer, then the method 400 continues with decision block 516 the outcome of which depends on whether there are more layers of the query to be considered. If more layers remain to be considered, then the method 400 loops back to block 502 to consider a next layer. If on the other hand the there are no more layers to be considered, the answer set for the operator at the root position of the query will have been evaluated and in step 518 that answer set along with retrieval relevance values for documents in the answer set is output. In outputting the final answer set for the query, images of multimedia documents in the answer set are preferably displayed to the user, e.g., in the search results window 122.

Figure 6:
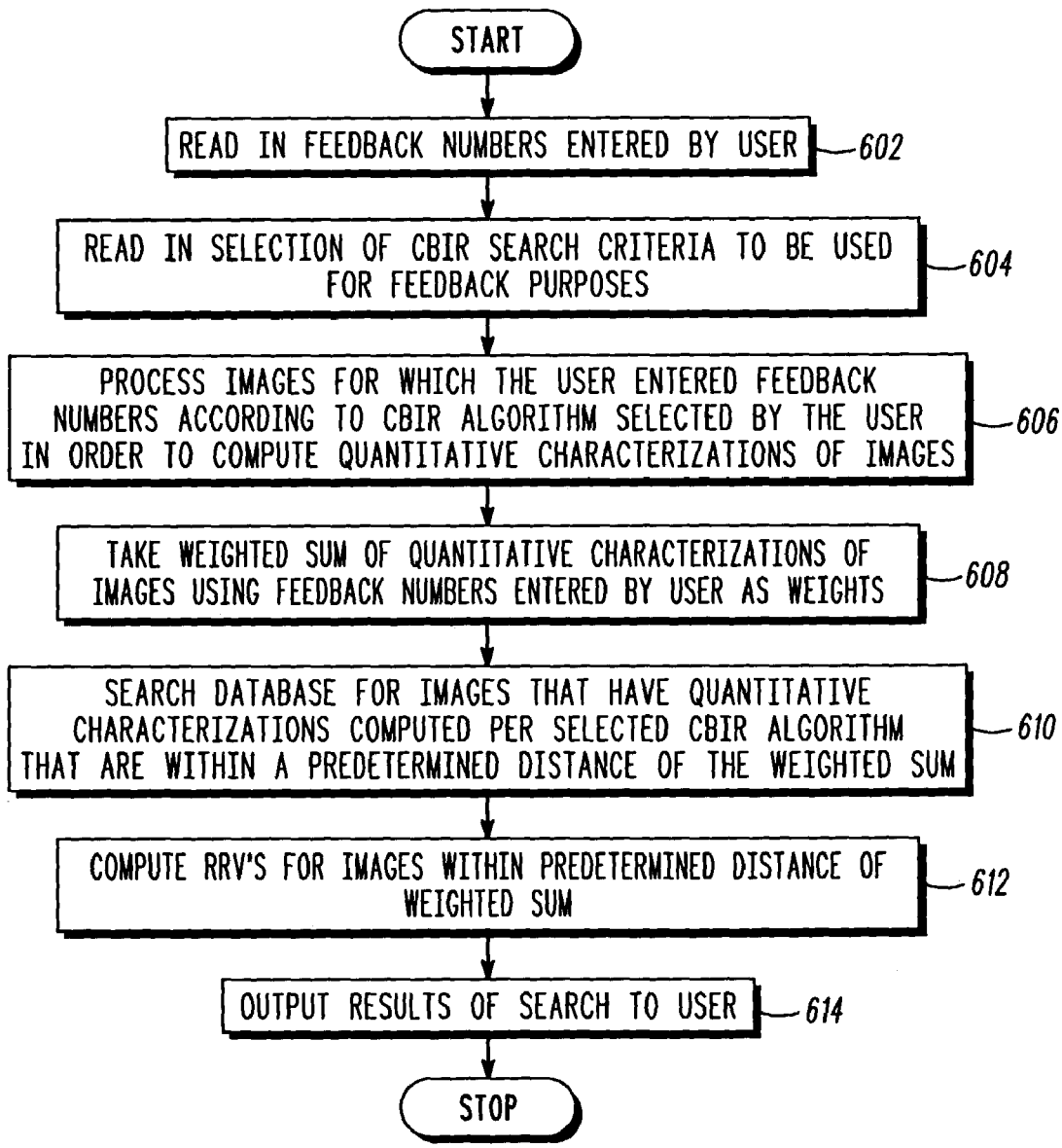
FIG. 6 is a flow chart of a method for processing user feedback according to the preferred embodiment of the invention.

FIG. 6 is a flow chart of a method 600 for processing user feedback according to the preferred embodiment of the invention. In step 602 feedback numbers entered by the user in order to rate images in a final answer set of a query are read in. Small text boxes 126 are provided in the results window 122 of the GUI 100 in order to accept feedback numbers by which the user rates answer set images.

In step 604 a selection of a CBIR search criteria to be used for feedback purposes is read in. The second set of check boxes 128 of the GUI is provided for accepting selection of the type of CBIR search criteria to be used for feedback purposes.

In step 606 the images for which the user entered feedback number are processed by the algorithm of the CBIR search criteria selected in step 604 in order to compute quantitative characterizations (e.g., feature vectors) of the images. Step 606 may have been performed ahead of time and quantitative characterizations stored in the database 224, e.g., in the relational database tables 218.

In step 608 a weighted sum is taken of the quantitative characterizations, using the weights that are based on (e.g., equal to) the user feedback numbers. The weighted sum is optionally normalized. In the weighted sum the weight used for each particular quantitative characterization is based on a feedback number corresponding to the image that the particular quantitative characterization characterizes.

In step 610 the database 224 is searched for images that have quantitative characterizations, computed per CBIR algorithm selected in step 604, that are within the predetermined distance limit corresponding to the selected CBIR algorithm of the weighted sum.

In step 614 retrieval relevance values are computed for the images found in step 610, preferably using equations one and two.

In step 614 the results of the search performed in step 610 are output to the user. If the user again provides feedback numbers and opts to have a feedback based search performed the method 600 will be repeated. Thus, the user and the search system 200 can interact in a recursive manner to search for what the user is seeking.

Figure 7:
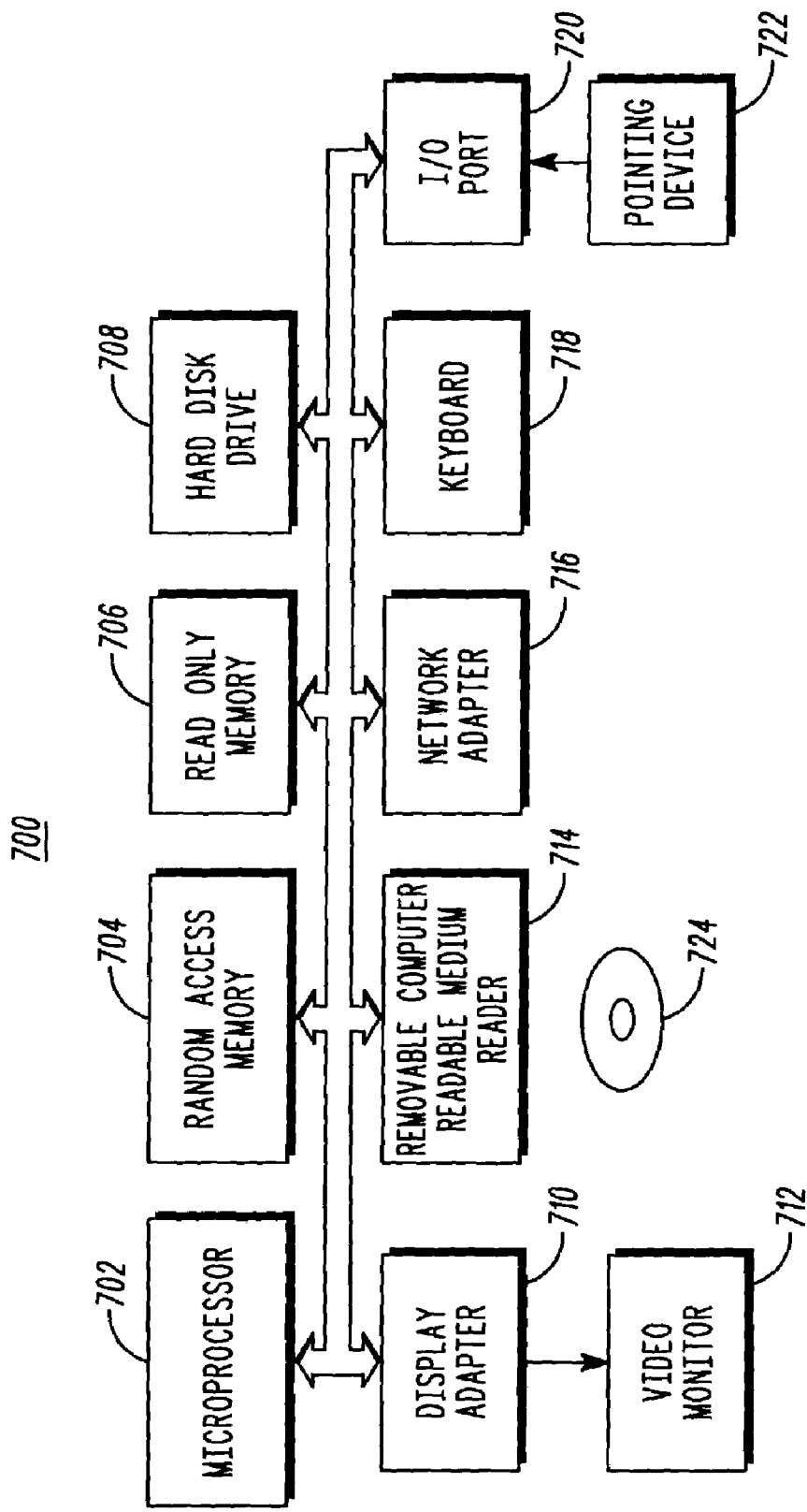
FIG. 7 is a block diagram of a computer used to execute the algorithms shown in FIGS. 4–6 according to the preferred embodiment of the invention.

FIG. 7 is a block diagram of a computer 700 used to execute the algorithms shown in FIGS. 4–6 according to the preferred embodiment of the invention. The computer 700 comprises a microprocessor 702, Random Access Memory (RAM) 704, Read Only Memory (ROM) 706, hard disk drive 708, display adopter 710, e.g., a video card, a removable computer readable medium reader 714, a network adapter 716, keyboard, and I/O port 720 communicatively coupled through a digital signal bus 726. A video monitor 712 is electrically coupled to the display adapter 710 for receiving a video signal. A pointing device 722, preferably a mouse, is electrically coupled to the I/O port 720 for receiving electrical signals generated by user operation of the pointing device 722. The hard disk drive 708 preferably stores the database. According to one embodiment of the invention, the network adapter 716 is used, to communicatively couple the computer 700 to one or more externally hosted databases or World Wide Web resources that serve as ad hoc databases. The computer readable medium reader 714 preferably comprises a Compact Disk (CD) drive. A computer readable medium 724 that includes software embodying the algorithms described above with reference to FIGS. 4–6 is provided. The software included on the computer readable medium 724 is loaded through the removable computer readable medium reader 714 in order to configure the computer 700 to carry out processes of the current invention that are described above with reference to flow diagrams. The computer 700 may for example comprise a personal computer or a work station computer.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A method for searching a database comprising, in a computer:

inputting a search string that comprises a plurality of search string arguments connected by one or more operators wherein each search string argument specifies a search criteria;

computing a distance measure between a quantitative characterization corresponding to each of one or more of the search criteria, and quantitative characterizations of each of a plurality of records;

selecting records for inclusion in answer sets for each mth search criteria among the one or more search criteria based, at least in part, on a plurality of distance measures each involving a quantitative characterization corresponding to the mth search criteria, and a quantitative characterization corresponding to one of the plurality of records;

for each jth record in the answer set of each mth search criteria among the one or more search criteria, computing a retrieval relevance value by a method that comprises mapping a distance measure corresponding to the mth search criteria and the jth record into a finite range;

for each ith record in the answer set of an mth content based retrieval algorithm based query, computing a retrieval relevance value by evaluating a function of the following form:

$$RRV_{i,m}{}^{C}=(1-H(G_F(X_i-X_m)))^{\eta}$$

where, $RRV_{i,m}{}^{c}$ is a retrieval relevance value of an ith media file to a mth search criteria basis media file based on a cth content based retrieval algorithm;

$x_i$ is a quantitative characterization of the ith media file based on the cth content based retrieval algorithm;

$x_m$ is a quantitative characterization of the mth search criteria basis media file based on the cth content based retrieval algorithm;

$G_F$ is a distance function;

H is a mapping function that maps an argument into a finite range; and $\eta$ is a constant exponent;

for each kth operator of the search string performing an operation specified by the kth operator on answer sets that are arguments of the kth operator to form a kth answer set for the kth operator;

for each nth record in the kth answer set for each kth operator, assigning a retrieval relevance value to the nth record in the kth answer set, wherein the retrieval relevance value is a mathematical function of one or more quantitative characterizations associated with the nth record in answer sets that are arguments of the kth operator.

2. The method according to claim 1 wherein:
selecting records for inclusion in answer sets for each mth search criteria comprises:
comparing the plurality of distance measures to one or more predetermined distance limits.

3. The method according to claim 1 wherein assigning a retrieval relevance value to the nth record in the kth answer set comprises:
assigning a retrieval relevance value to the nth record in the kth answer set that is derived from retrieval relevance values associated with the nth record in answer sets that are arguments of the kth operator.

4. The method according to claim 1 wherein:
inputting a search string comprises:
inputting a search string that comprises one or more search string arguments that are associated with one or more user specified confidence levels; and
for each record in the answer set of each mth search criteria among the one or more search criteria, computing a retrieval relevance value comprises:
multiplying a value obtained by mapping, by a function of the user specified confidence level.

5. The method according to claim 4 wherein:
the function is the identity function.

6. The method according to claim 1 wherein:
$G_F$ is selected from the group consisting of the one-norm and the two-norm.

7. The method according to claim 1 where the mapping function H is defined as:

$$H(\text{arg}) = \begin{cases} 0, & \text{arg} < d_{\min} \\ \dfrac{\text{arg}}{d_{\max}}, & x \in [d_{\min}, d_{\max}] \\ 1.0, & \text{arg} > d_{\max} \end{cases}$$

where, $d_{min}$ is approximately equal to a minimal perceptible distance;
$d_{max}$ corresponds approximately to a distance between quantitative characterizations beyond which further increases are not generally perceived as more different.

8. The method according to claim 3 wherein:
inputting a search string comprises:
inputting a search string that comprises one or more Boolean AND operators;
for each kth operator of the search string performing an operation specified by the kth operator comprises:
for each lth AND operator of the search string taking and intersection of answer sets that are arguments of the lth AND operator to form an answer set for the lth AND operator;
for each nth record in the answer set for each kth operator, assigning a retrieval relevance value to the nth record comprises:
for each mth record in the answer set for each lth AND operator, assigning a retrieval relevance value that is a minimum of retrieval relevance values associated with the mth record in answer sets that are arguments of the lth AND operator.

9. The method according to claim 3 wherein:
inputting a search string comprises:
inputting a search string that comprises one or more Boolean OR operators;
for each kth operator of the search string performing an operation specified by the kth operator comprises:
for each lth OR operator of the search string taking a union of answer sets that are arguments of the lth OR operator to form an answer set for the lth OR operator;
for each nth record in the answer set for each kth operator, assigning a retrieval relevance value to the nth record comprises:
for each mth record in the answer set for each ith OR operator, assigning a retrieval relevance value that is a maximum of one or more relevance retrieval values associated with the mth record in answer sets that are arguments of the lth OR operator.

10. The method according to claim 1 wherein:
inputting a search string comprises:
inputting a search string that comprises content based image retrieval criteria.

11. The method according to claim 10 wherein:
inputting a search string that comprises content base image retrieval criteria comprises:
inputting a search string that comprises one or more content based image retrieval criteria selected from the group consisting of: color layout, dominant color, homogeneous texture, edge histogram, shape region, and shape contour.

12. The method according to claim 1 wherein
inputting a search string comprises:
inputting a search string that comprises a plurality of search string arguments including references to prior queries.

13. A method for searching a database of multimedia documents the method comprising, in a computer:
(a) inputting a search string that comprises a plurality of search string arguments comprising one or more key words, and one or more perceptual feature search specifications, wherein the plurality of search string arguments are connected by one or more search operators, and wherein at least one of the plurality of search string arguments is associated with a user specified confidence level;
(b) searching the database of multimedia documents using each of the search string arguments to obtain an answer set of multimedia documents for each of the search string arguments;
(c) for each ith record in the answer set of each mth search string argument among the plurality of search criteria arguments, computing a retrieval relevance value by a method that comprises mapping a distance measure corresponding to the mth search string argument and the ith record into a finite range;
for each ith record in the answer set of each mth search string argument including a perceptual feature search specification, computing a retrieval relevance value by evaluating a function of the following form:

$$RRV_{i,m}{}^C = (1 - H(G_F(X_i - X_m)))^n$$

where,
$RRV_{i,m}{}^c$ is a retrieval relevance value of an ith media file to a mth search criteria basis media file based on a cth content based retrieval algorithm;
$x_i$ is a quantitative characterization of the ith media file based on the cth content based retrieval algorithm;

$x_m$ is a quantitative characterization of the mth search criteria basis media file based on the cth content based retrieval algorithm;

$G_F$ is a distance function;

H is a mapping function that maps an argument into a finite range; and

η is a constant exponent;

(d) for each answer set corresponding to a search string argument associated with a user specified confidence level, adjusting retrieval relevance values associated with multimedia documents in the answer set based on the confidence level;

(e) for each particular search operator performing an operation specified by the particular search operator on answer sets that are arguments of the particular search operator to form an answer set for the particular operator;

(f) for each multimedia document in the answer set for a particular operator, assigning a retrieval relevance to each multimedia document in the answer set for the particular operator that is derived from one or more retrieval relevance values associated with the multimedia document in answer sets that are arguments of the particular search operator; and repeating steps (e)–(f) until the search string is evaluated.

14. A method for searching a database comprising, in a computer:

inputting a search string that comprises a plurality of search string arguments connected by one or more search operators, and wherein at least one of the plurality of search string arguments is associated with a user specified confidence level;

searching the database using each particular search string argument to obtain an answer set of records for the particular search string argument;

for each ith record in the answer set of each mth search string argument among the plurality of search criteria arguments, computing a retrieval relevance value by evaluating a function of the following form:

$$RRV_{i,m}{}^C = (1 - H(G_F(X_i - X_m)))^\eta$$

where, $RRVi,m^c$ is a retrieval relevance value of an ith record to a mth search criteria basis file based on a cth retrieval algorithm;

$x_i$ is a quantitative characterization of the ith record based on the cth retrieval algorithm;

$x_m$ is a quantitative characterization of the mth search criteria basis file based on the cth content based retrieval algorithm;

$G_F$ is a distance function;

H is a mapping function that mans an argument into a finite range; and

η is a constant exponent;

for each answer set corresponding to a search string argument that is associated with a user specified confidence level, adjusting retrieval relevance values associated with records in the answer set based on the confidence level;

for each kth particular search operator performing an operation specified by the kth particular search operator on answer sets associated with arguments of the kth particular search operator to form an answer set for the kth particular operator; and for each nth record in the answer set for each kth particular operator, assigning a retrieval relevance value to the nth record in the answer set that is derived from one or more retrieval relevance values associated with the record in answer sets associated with arguments of the particular search operator.

15. A computer readable medium including programming instructions for searching a database including programming instructions for:

inputting a search string that comprises a plurality of search string arguments connected by one or more operators wherein each search string argument specifies a search criteria;

computing a distance measure between a quantitative characterizations corresponding to each of one or more of the search criteria, and quantitative characterizations of each of a plurality of records;

selecting records for inclusion in answer sets for each mth search criteria among the one or more search criteria based, at least in part, on a plurality of distance measures each involving a quantitative characterization corresponding to the mth search criteria, and a quantitative characterization corresponding to one of the plurality of records;

for each jth record in the answer set of each mth search criteria among the one or more search criteria, computing a retrieval relevance value by a method that comprises mapping a distance measure corresponding to the mth search criteria and the jth record into a finite range;

for each ith record in the answer set of an mth content based retrieval algorithm based query, computing a retrieval relevance value by evaluating a function of the following form:

$$RRV_{i,m}{}^C = (1 - H(G_F(X_i - X_m)))^\eta$$

where, $RRVi,m^c$ is a retrieval relevance value of an ith media file to a mth search criteria basis media file based on a cth content based retrieval algorithm;

$x_i$ is a quantitative characterization of the ith media file based on the cth content based retrieval algorithm;

$x_m$ is a quantitative characterization of the mth search criteria basis media file based on the cth content based retrieval algorithm;

$G_F$ is a distance function;

H is a mapping function that mans an argument into a finite range; and

η is a constant exponent;

for each kth operator of the search string performing an operation specified by the kth operator on answer sets that are arguments of the kth operator to form a kth answer set for the kth operator; and for each nth record in the kth answer set for each kth operator, assigning a retrieval relevance value to the nth record in the kth answer set, wherein the retrieval relevance value is a mathematical function of one or more quantitative characterizations associated with the nth record in answer sets that are arguments of the kth operator.

16. The computer readable medium according to claim 15 wherein the programming instructions for selecting records for inclusion in answer sets for each mth search criteria comprise programming instructions for:

comparing the plurality of distance measures to one or more predetermined distance limits.

17. The computer readable medium according to claim 15 wherein:
the programming instructions for inputting a search string comprise programming instructions for:
inputting a search string that comprises one or more search string arguments that are associated with one or more user specified confidence levels; and
for each record in the answer set of each mth search criteria among the one or more search criteria, computing a retrieval relevance value comprises:
multiplying a value obtained by mapping, by a function of the user specified confidence level.

18. The computer readable medium according to claim 15 wherein the programming instructions for assigning a retrieval relevance value to the nth record in the kth answer set comprise programming instructions for:
assigning a retrieval relevance value to the nth record in the kth answer set that is derived from retrieval relevance values associated with the nth record in answer sets that are arguments of the kth operator.

19. The computer readable medium according to claim 18 wherein the programming instructions for:
inputting a search string comprises programming instructions for:
inputting a search string that comprises one or more Boolean AND operators;
the programming instructions for:
for each kth operator of the search string performing an operation specified by the kth operator comprise programming instructions for:
for each lth AND operator of the search string taking an intersection of answer sets that are arguments of the lth AND operator to form an answer set for the lth AND operator;
for each nth record in the answer set for each kth operator, assigning a retrieval relevance value to the nth record comprises:
for each mth record in the answer set for each lth AND operator, assigning a retrieval relevance value that is a minimum of one or more retrieval relevance values associated with the mth record in answer sets that are arguments of the lth AND operator.

20. The computer readable medium according to claim 18 wherein:
the programming instructions for inputting a search string comprise programming instructions for:
inputting a search string that comprises one or more Boolean OR operators;
the programming instructions for, for each kth operator of the search string performing an operation specified by the kth operator comprise programming instructions for:
for each lth OR operator of the search string taking a union of answer sets that are arguments of the lth OR operator to form an answer set for the lth OR operator;
for each nth record in the answer set for each kth operator, assigning a retrieval relevance value to the nth record comprises:
for each mth record in the answer set for each lth OR operator, assigning a retrieval relevance value that is a maximum of one or more relevance retrieval values associated with the mth record in answer sets that are arguments of the lth OR operator.

* * * * *